US008010422B1

(12) United States Patent
Lascelles et al.

(10) Patent No.: US 8,010,422 B1
(45) Date of Patent: Aug. 30, 2011

(54) ON-LINE BALANCE TRANSFERS

(75) Inventors: Scott Lascelles, Williston, VT (US); Jay Ludlam, Oakland, CA (US); Ricky Chang, Irvine, CA (US); Eric R. Meeks, San Francisco, CA (US)

(73) Assignee: Nextcard, LLC, Marshall, TX (US)

( * ) Notice: Subject to any disclaimer, the term of this patent is extended or adjusted under 35 U.S.C. 154(b) by 1426 days.

(21) Appl. No.: 09/991,894

(22) Filed: Nov. 13, 2001

Related U.S. Application Data

(63) Continuation-in-part of application No. 09/185,000, filed on Nov. 3, 1998, now Pat. No. 6,324,524.

(51) Int. Cl.
*G06Q 40/00* (2006.01)
*G06K 5/00* (2006.01)

(52) U.S. Cl. .............. 705/35; 705/38; 705/39; 235/379; 235/380

(58) Field of Classification Search .................... 705/39, 705/1, 1.1, 14, 14.39, 35, 38; 235/379, 380
See application file for complete search history.

(56) References Cited

U.S. PATENT DOCUMENTS

| 3,982,103 | A |   | 9/1976  | Goldman           |         |
|-----------|---|---|---------|-------------------|---------|
| 4,736,294 | A |   | 4/1988  | Gill et al.       |         |
| 4,774,664 | A |   | 9/1988  | Campbell et al.   |         |
| 4,860,341 | A |   | 8/1989  | D'Avello et al.   |         |
| 4,868,376 | A |   | 9/1989  | Lessin et al.     |         |
| 4,872,113 | A |   | 10/1989 | Dinerstein        |         |
| 4,958,368 | A |   | 9/1990  | Parker            |         |
| 5,175,416 | A | * | 12/1992 | Mansvelt et al.   | 235/379 |
| 5,187,735 | A |   | 2/1993  | Herrero Garcia et al. | 379/88 |
| 5,221,838 | A |   | 6/1993  | Gutman et al.     |         |
| 5,235,519 | A |   | 8/1993  | Miura             |         |
| 5,239,462 | A |   | 8/1993  | Jones et al.      | 364/408 |
| 5,262,941 | A |   | 11/1993 | Saladin et al.    | 364/408 |
| 5,274,547 | A |   | 12/1993 | Zoffel et al.     |         |
| 5,285,382 | A |   | 2/1994  | Muehlberger et al.|         |
| 5,372,507 | A |   | 12/1994 | Goleh             |         |
| 5,375,055 | A |   | 12/1994 | Togher et al.     |         |
| 5,387,783 | A |   | 2/1995  | Mihm et al.       | 235/375 |

(Continued)

FOREIGN PATENT DOCUMENTS

EP  0402302 A2  12/1990

(Continued)

OTHER PUBLICATIONS

Wayback machine—Capital One and Chase examples.*

(Continued)

*Primary Examiner* — Ella Colbert
(74) *Attorney, Agent, or Firm* — Marc A. Hubbard; Gardere Wynne & Sewell LLP

(57) ABSTRACT

A system and method are disclosed for online transfer of a balance from a first credit account associated with an account holder to a second credit account associated with the account holder. Account data associated with the first credit account is obtained. The account data comprises at least the financial institution with which the first credit account is held. A determination is made as to whether the financial institution with which the first credit account is held is related to the financial institution with which the second credit account is held. The first credit account is identified as being not eligible for a balance transfer to the second credit account if it is determined that the first credit account is held with a financial institution that is related to the financial institution with which the second credit account is held.

28 Claims, 9 Drawing Sheets

U.S. PATENT DOCUMENTS

| | | | |
|---|---|---|---|
| 5,450,537 A | 9/1995 | Hirai et al. .................... 395/149 |
| 5,453,601 A * | 9/1995 | Rosen .............................. 705/65 |
| 5,457,797 A | 10/1995 | Butterworth et al. |
| 5,481,647 A | 1/1996 | Brody et al. |
| 5,491,817 A | 2/1996 | Gopal et al. |
| 5,557,518 A | 9/1996 | Rosen |
| 5,576,951 A | 11/1996 | Lockwood |
| 5,590,038 A * | 12/1996 | Pitroda .......................... 705/41 |
| 5,604,341 A | 2/1997 | Grossi et al. |
| 5,611,052 A | 3/1997 | Dykstra et al. ................. 395/238 |
| 5,659,165 A * | 8/1997 | Jennings et al. .............. 235/379 |
| 5,659,731 A | 8/1997 | Gustafson |
| 5,696,907 A | 12/1997 | Tom .............................. 395/238 |
| 5,699,527 A | 12/1997 | Davidson |
| 5,701,400 A | 12/1997 | Amado |
| 5,703,949 A | 12/1997 | Rosen |
| 5,704,029 A | 12/1997 | Wright, Jr. .................... 395/149 |
| 5,724,155 A | 3/1998 | Saito |
| 5,727,163 A | 3/1998 | Bezos ............................ 395/227 |
| 5,732,400 A | 3/1998 | Mandler et al. |
| 5,734,659 A | 3/1998 | Mann et al. |
| 5,745,654 A | 4/1998 | Titan .............................. 395/22 |
| 5,748,755 A | 5/1998 | Johnson et al. |
| 5,761,640 A | 6/1998 | Kalyanswamy et al. ..... 704/260 |
| 5,764,916 A | 6/1998 | Busey et al. |
| 5,774,882 A | 6/1998 | Keen et al. ..................... 705/38 |
| 5,774,883 A | 6/1998 | Andersen et al. ............... 205/38 |
| 5,778,164 A | 7/1998 | Watkins et al. |
| 5,797,133 A | 8/1998 | Jones et al. ..................... 705/38 |
| 5,802,499 A | 9/1998 | Sampson et al. |
| 5,819,029 A | 10/1998 | Edwards et al. .............. 395/186 |
| 5,819,235 A | 10/1998 | Tamai et al. |
| 5,819,236 A | 10/1998 | Josephson ....................... 705/35 |
| 5,819,291 A | 10/1998 | Haimowitz et al. ........... 707/201 |
| 5,832,465 A | 11/1998 | Tom .............................. 706/51 |
| 5,857,079 A * | 1/1999 | Claus et al. .................... 705/33 |
| 5,866,889 A | 2/1999 | Weiss et al. |
| 5,870,721 A | 2/1999 | Norris .............................. 705/38 |
| 5,878,403 A | 3/1999 | DeFrancesco et al. ......... 705/38 |
| 5,878,404 A | 3/1999 | Stout, Jr. et al. |
| 5,911,135 A | 6/1999 | Atkins ............................ 705/36 |
| 5,911,136 A | 6/1999 | Atkins |
| 5,920,847 A | 7/1999 | Kolling et al. |
| 5,930,776 A | 7/1999 | Dykstra et al. ................. 705/38 |
| 5,940,811 A | 8/1999 | Norris ............................ 705/38 |
| 5,940,812 A | 8/1999 | Tengel et al. ................... 705/38 |
| 5,950,179 A | 9/1999 | Buchanan et al. .............. 705/38 |
| 5,960,411 A | 9/1999 | Hartman et al. ................ 705/26 |
| 5,963,625 A | 10/1999 | Kawecki et al. |
| 5,966,699 A | 10/1999 | Zandi .............................. 705/38 |
| 5,966,700 A | 10/1999 | Gould et al. |
| 5,970,478 A | 10/1999 | Walker et al. ................... 705/35 |
| 5,987,434 A | 11/1999 | Libman .......................... 705/36 |
| 5,991,740 A | 11/1999 | Messer ........................... 705/27 |
| 5,995,947 A | 11/1999 | Fraser et al. .................... 705/38 |
| 5,995,948 A | 11/1999 | Whitford et al. |
| 6,000,832 A | 12/1999 | Franklin et al. ........... 364/479.02 |
| 6,014,645 A * | 1/2000 | Cunningham .................. 705/38 |
| 6,029,149 A | 2/2000 | Dykstra et al. ................. 705/38 |
| 6,029,890 A | 2/2000 | Austin ............................ 235/380 |
| 6,044,360 A * | 3/2000 | Picciallo ........................ 705/21 |
| 6,049,784 A | 4/2000 | Weatherly et al. |
| 6,058,428 A | 5/2000 | Wang et al. |
| 6,064,987 A | 5/2000 | Walker et al. ................... 705/38 |
| 6,070,149 A | 5/2000 | Tavor et al. |
| 6,070,798 A | 6/2000 | Nethery |
| 6,085,126 A | 7/2000 | Mellgren, III et al. |
| 6,085,195 A | 7/2000 | Hoyt et al. |
| 6,088,686 A | 7/2000 | Walker et al. ................... 705/38 |
| 6,092,057 A | 7/2000 | Zimmerman et al. |
| 6,105,007 A | 8/2000 | Norris ............................ 705/38 |
| 6,112,190 A | 8/2000 | Fletcher et al. ................. 705/38 |
| 6,119,103 A | 9/2000 | Basch et al. ..................... 705/35 |
| 6,138,139 A | 10/2000 | Beck et al. |
| 6,144,991 A | 11/2000 | England |
| 6,154,729 A | 11/2000 | Cannon et al. |
| 6,167,395 A | 12/2000 | Beck et al. |
| 6,182,124 B1 | 1/2001 | Lau et al. ...................... 709/217 |
| 6,185,543 B1 | 2/2001 | Galperin et al. |
| 6,192,380 B1 | 2/2001 | Light et al. .................... 707/505 |
| 6,199,079 B1 | 3/2001 | Gupta et al. ................... 707/507 |
| 6,202,053 B1 | 3/2001 | Christiansen et al. .......... 705/38 |
| 6,202,155 B1 | 3/2001 | Tushie et al. |
| 6,208,979 B1 | 3/2001 | Sinclair ......................... 705/38 |
| 6,233,565 B1 | 5/2001 | Lewis et al. |
| 6,240,396 B1 | 5/2001 | Walker et al. |
| 6,267,292 B1 * | 7/2001 | Walker et al. ................. 235/379 |
| 6,272,506 B1 | 8/2001 | Bell |
| 6,289,319 B1 | 9/2001 | Lockwood |
| 6,301,591 B2 | 10/2001 | Katsumata et al. |
| 6,311,169 B2 | 10/2001 | Duhon |
| 6,311,178 B1 | 10/2001 | Bi et al. |
| 6,324,524 B1 | 11/2001 | Lent et al. |
| 6,330,546 B1 | 12/2001 | Gopinathan et al. |
| 6,343,279 B1 | 1/2002 | Bissonette et al. |
| 6,349,290 B1 | 2/2002 | Horowitz et al. .............. 705/35 |
| 6,354,490 B1 | 3/2002 | Weiss et al. |
| 6,356,909 B1 | 3/2002 | Spencer |
| 6,374,230 B1 | 4/2002 | Walker et al. |
| 6,385,594 B1 | 5/2002 | Lebda et al. .................... 705/38 |
| 6,389,541 B1 | 5/2002 | Patterson |
| 6,405,181 B2 | 6/2002 | Lent et al. ....................... 705/38 |
| 6,438,526 B1 | 8/2002 | Dykes et al. .................... 705/38 |
| 6,449,646 B1 | 9/2002 | Sikora et al. |
| 6,488,203 B1 * | 12/2002 | Stoutenburg et al. ......... 235/379 |
| 6,505,176 B2 | 1/2003 | DeFrancesco, Jr. et al. |
| 6,510,418 B1 | 1/2003 | Case et al. |
| 6,513,018 B1 | 1/2003 | Culhane |
| 6,516,421 B1 | 2/2003 | Peters |
| 6,535,492 B2 | 3/2003 | Shtivelman |
| 6,542,936 B1 | 4/2003 | Mayle et al. |
| 6,567,791 B2 | 5/2003 | Lent et al. |
| 6,584,467 B1 | 6/2003 | Haught et al. |
| 6,598,030 B1 | 7/2003 | Siegel et al. |
| 6,611,816 B2 | 8/2003 | Lebda et al. |
| 6,622,131 B1 | 9/2003 | Brown et al. |
| 6,625,645 B1 | 9/2003 | Van Horne et al. |
| 6,718,313 B1 | 4/2004 | Lent et al. |
| 6,766,302 B2 | 7/2004 | Bach |
| 6,785,661 B1 | 8/2004 | Mandler et al. |
| 6,795,812 B1 | 9/2004 | Lent et al. |
| 6,920,434 B1 | 7/2005 | Cossette |
| 6,937,990 B1 | 8/2005 | Walker et al. |
| 6,976,056 B1 | 12/2005 | Kumar |
| 7,020,631 B2 | 3/2006 | Freeman et al. |
| 7,096,198 B1 | 8/2006 | Cuervo |
| 7,130,828 B2 | 10/2006 | Phillips et al. |
| 7,143,063 B2 | 11/2006 | Lent et al. |
| 7,194,436 B2 | 3/2007 | Tammaro |
| 7,230,927 B1 | 6/2007 | Villena et al. |
| 7,251,624 B1 | 7/2007 | Lee et al. |
| 7,315,841 B1 | 1/2008 | McDonald et al. |
| 7,346,576 B2 | 3/2008 | Lent et al. |
| 7,395,239 B1 | 7/2008 | Riseman |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0014877 A1 | 8/2001 | Defrancesco et al. |
| 2001/0027436 A1 | 10/2001 | Tenembaum |
| 2001/0054064 A1 | 12/2001 | Kannan |
| 2002/0016731 A1 | 2/2002 | Kupersmit |
| 2002/0023051 A1 | 2/2002 | Kunzle et al. |
| 2002/0029188 A1 | 3/2002 | Schmid |
| 2002/0035543 A1 | 3/2002 | Shedd et al. |
| 2002/0055906 A1 | 5/2002 | Katz et al. |
| 2002/0067500 A1 | 6/2002 | Yokomizo et al. |
| 2002/0111850 A1 | 8/2002 | Smrcka et al. |
| 2002/0198808 A1 | 12/2002 | Myers |
| 2003/0055778 A1 | 3/2003 | Erlanger |
| 2003/0105725 A1 | 6/2003 | Hoffman |
| 2003/0195848 A1 | 10/2003 | Felger |
| 2004/0019558 A1 | 1/2004 | McDonald et al. |
| 2004/0064412 A1 | 4/2004 | Phillips et al. |
| 2005/0004864 A1 | 1/2005 | Lent et al. |
| 2006/0036543 A1 | 2/2006 | Blagg et al. |
| 2006/0153350 A1 | 7/2006 | Felger |

| | | | |
|---|---|---|---|
| 2007/0027785 | A1 | 2/2007 | Lent et al. |
| 2007/0072585 | A1 | 3/2007 | Johnson et al. |
| 2007/0124214 | A1 | 5/2007 | Blandina et al. |
| 2007/0226141 | A1 | 9/2007 | Phillips et al. |
| 2008/0021816 | A1 | 1/2008 | Lent et al. |
| 2008/0270294 | A1 | 10/2008 | Lent et al. |
| 2008/0270295 | A1 | 10/2008 | Lent et al. |

FOREIGN PATENT DOCUMENTS

| | | |
|---|---|---|
| EP | 0840244 A1 | 6/1998 |
| EP | 1233361 | 8/2002 |
| EP | 1850284 | 10/2007 |
| JP | 409288453 | 11/1997 |
| JP | 2002328974 | 11/2002 |
| WO | WO-9641287 A1 | 12/1996 |
| WO | WO97/22073 | 6/1997 |
| WO | WO-9840809 A2 | 9/1998 |
| WO | WO-9845797 | 10/1998 |
| WO | WO-9901826 A2 | 1/1999 |
| WO | WO-9909470 | 2/1999 |
| WO | WO-9944152 | 9/1999 |

OTHER PUBLICATIONS

Albert B. Crenshaw; "It Can Be Easy to Cut Credit Cards' Costs; Many Low-Rate Issuers Help Pay Old Balance"; Highbeam Research; Dec. 15, 1991; pp. 1-2.*
Hanke, Ed; King Card; Credit Union Management, v16n12; Dec. 1993; pp. 1-3.*
Anonymous; "On-line system approves loans while customer waits"; Communication News; Nokomis; Sep. 1994, vol. 31, Issue.9; pp. 1-2.*
Alsop, Stewart; "The first powerhouse bank of the virtual world"; Fortune, v138 n5; Sep. 7, 1998; p. 1.*
Business Editors: "NextCard: The New Competition in Online Credit Cards: NextCard Visa versus the Yahoo/First USA Visa"; Feb. 23, 1998; pp. 1-3.*
Anon, Regulation Z Commentary Amendments, Retail Banking Digest, vol. 15, No. 2, p. 17-18, Mar.-Apr. 1995.
Black, H.C., Black's Law Dictionary, p. 1586-1589, West Publishing Co., St. Paul, Minnesota, 1990.
Emigh, J., "AnswerSoft Unveils Concerto for Web-Based Call Centers Feb. 5, 1996," Newsbytes, Feb. 5, 1997.
Grigonis, R., "Webphony—It's not Just Callback Buttons Anymore," Computer Telephony, p. 92, Dec. 1997.
Wagner, M., "Caring for Customers," Internet World, Sep. 1, 1999.
Sweat, J., "Human Touch—A New Wave of E-Service Offerings Blends the Web, E-Mail, and Voice Bringing People back into the Picture," Informationweek, Oct. 4, 1999.
Kirkpatrick, K., "Electronic Exchange 2000, The," Computer Shopper, Nov. 1999.
Anon., "InstantService.com Teams with Island Data to provide Integrated Solution for Online Customer Response," Business Wire, May 22, 2000.
Kersnar, S., "Countrywide Offers Proprietary Technology for Online Wholesale Lending," National Mortgage News, vol. 24, No. 38, p. 8, Jun. 5, 2000.
Microsoft Press Computer Dictionary, Third Edition, Microsoft Press, Redmond, 1997, pp. 88 and 265.
Whiteside, D.E., "One Million and Counting," Collections and Credit Risk, vol. 1, No. 11, p. 38, Nov. 1996.
Fickenscher, L., "Providian Undercuts rivals with 7.9% Rate Offer," American banker, vol. 163, p. 16, Oct. 8, 1998.
Fargo, J., "The Internet Specialists," Credit Card Management, vol. 11, No. 10, pp. 38-45, Jan. 1999.
Lemay, T., "Browsing for a Mortgage a Click away," Financial Post, p. 1, Jan. 15, 2000.
Wijnen, R., "Banks Fortify Online Services," Bank Technology News, vol. 13, No. 3, p. 8, Mar. 2000.
Armstrong, Douglas "Firstar Web Site Helps Add Up Future", Milwaukee Journal Sentinel, Mar. 28, 1996, Final Edition, front page through p. 8.
Anon. "IADFC Launches NextCard, The First True Internet VISA," Business Wire, New York: Feb. 6, 1998, p. 1 (3 pages).

Lazarony, Lucy, "Only Online Applicants Need Apply," Bank Advertising News, North Palm Beach, Mar. 23, 1998, vol. 21, Issue 15, p. 1 (3 pages).
FIData, Inc., News & Press Releases, "Instant Credit Union Loans via the Internet," http://web.archive.org/web/19990221115203/www.fidata-inc.com/news-pr01.htm.
FIData, Inc., Press Releases, "Instant Loan Approvals via the Internet," http://www.fidata-inc.com/news/pr_040198.htm, Apr. 1, 1998.
Staff, "On-Line System Approves Loans While Customer Waits"— Abstract, Communication News, vol. 31, Issue 9, Sep. 1994.
Hibbard, Justin; Dalton, Gregory; Thyfault, Mary E.; "Web-based Customer Care," InformationWeek, Jun. 1, 1998, 684, 18-20 (3 pages).
"ESL Federal Credit Union Inaugurates Internet Target Marketing," PR Newswire, 210, Oct. 6, 1998 (3 pages).
Nash, Kim S. "Calling all Customers," Computerworld, Dec. 1997, p. 25 and 28 (2 pages).
Anon. "Affordable Lending Systems Now Available for Smaller Financial Institutions," Business Wire, May 18, 1998 (2 pages).
Nexis—All News Sources—Examiner's NPL Search Results in U.S. Appl. No. 11/932,498, included with Office Action issued Oct. 8, 2008.
"Sample Experian Credit Report" by Consumer Information @222.consumerinfo.con/espsam.htm at we.archive.org/web/Jul. 9, 1998.
Anon. "AnswerSoft Announces Concerto; First to Combine Call Center Automation with Power of Web," Business Wire, Feb. 3, 1997.
Nelson, Marilyn, "Teacher Certification Program Update." International Journal of Childbirth Education, International Childbirth Education Association, 1996, HighBeam Research, Jun. 16, 2009; http://www.highbeam.com (3 pages).
Automated Underwriting Makes it Possible to Increase Origination Volume CFX Bank and GMAC Mortgage, which use Freddie Mac and Fannie Mae Publication title: American Banker, New York, NY; Sep. 15, 1997, vol. 162, Issue 177; p. 8A; Source type: Newspaper ISSN: 00027561 ProQuest document ID: 14136944; http://proquest.umi.com/pqdweb?did=14136944&sid (3 pages).
Plaintiff's Original Complaint, NextCard, LLC v. Chase Bank USA, N.A., et al., Civil Action No. 2:09-cv-00394-TJW, in the U.S. District Court for the Eastern District of Texas, Marshall Division, filed Dec. 22, 2009 (9 pages).
"Realty Agent, Lender Can Help Figure Out If the Price is Right," Chicago Sun-Times 1988. HighBeam Research. Jan. 27, 2010, http://www.highbeam.com.
Anon, Regulation Z Commentary Amendments, Retail Banking Digest, vol. 15, No. 2, p. 17-18, Mar.-Apr. 1995.
Anon, San Diego Savings Association Offers Customers No-Fee Visa Product, Card News, Feb. 29, 1988 Black, H.C., Black's Law Dictionary, pp. 1586-1589, West Publishing Co. St Paul, Min., 1990.
Bloom, J.K., "For This New Visa, Only Web Surfers Need Apply," American Banker, vol. 1163, No. 34, p. 12, Feb. 20, 1998.
"Solutions for E-Commerce, Communications, Support and Web/Call Center Integration," Technology Marketing Corporation, copyright Mar. 2000.
"Online marketing: A New Cure for Shoppus Interruptus—Brief Article," dated Aug. 2000.
Notice of Allowance mailed Feb. 3, 2011, in U.S. Appl. No. 10/901,715.
Non-Final Office Action mailed Aug. 10, 2010, in U.S. Appl. No. 12/819,712.
Response to Non-Final Office Action mailed Aug. 10, 2010, in U.S. Appl. No. 12/819,712.
Defendant's Preliminary Invalidity Contentions (without appendices); NextCard, LLC v. Chase Bank USA, N.A., et al.; Civil Action No. 2:09-cv-394-TJW, in the U.S. District Court for the Eastern District of Texas, Marshall Division, dated Dec. 3, 2010 (31 pages).
Anon, "Citgo Puts a New Spin on the Cobranded Oil Card", Credit Card News, p4, Nov. 1, 1995.
Anon, Microsoft Targets more than PIM Market with Outlook 2000, Computer Reseller News, n805, p. 99, Aug. 1998.
"To Boost Balances, AT&T Renews No-Fee Universal Card Offer", The Report on AT&T, V10, n. 13, Mar. 30, 1992.

Bank Technology News, Low Rent Loan Officer in a Kiosk, v8, No. 2, p. 5, Feb. 1995.
Block, Valerie, "Network Assembles Card Issuers at an Internet Site", American Banker, v160, n198, p. 11.
Borowsky, Mark, The Neural Net: Predictor of Fraud or Victim of Hype?, Bank Technology News, p. 7, Sep. 1993.
Calvey, Mark, "Internet Gives Bankers a Snappy Comeback", S. F. Business Times, v. 13, n. 5, p. 3, Sep. 11, 1998.
Canter, Ronald S., "Lender Beware-Federal Regulation of Consumer Credit", Credit World, v8, n5, pp. 16-20, May/Jun. 1993.
Chesanow, Neil, "Pick the Right credit Cards and use them wisely", Medical Economics, v75, n16, p. 94, Aug. 1998.
The New Encyclopedia Britannica, vol. 3, 15$^{th}$ Edition, "Credit".
Credit Card Network, USA, http://www.creditnet.com/consumers.html.
CreditNet Financial Network, http://consumers.creditnet.com.
Duclax, Denise, A Check for $5,000, in Ten Minutes, ABA Banking Journal, v87, n8, p. 45, Aug. 1995.
FICO, http://houseloans.idis.com/fico.html.
FIData, Inc, Press Release, Aug. 26.
Friedland, Marc, "Credit Scoring Digs Deeper into Data", Credit World, v84, n5, p. 19-23, May-Jun. 1996.
Handley, John, "Credit Review Lets the Numbers Do the Talking in Home Mortgage Game", Chicago Tribune, Jul. 12, 1998.
Hollander, Geoffrey, "Sibling Tool Personator 3 Untangles File Formats", InfoWorld, v20, n5, p. 102, Feb. 2, 1998.
Kantrow, Yvette D., "Banks Press Cardholders to Take Cash Advances", American Banker, v157, n18, p. 1.
Web Page Results for FICO: Altavista.com, Mar. 20, 2001.
Lotis Delivers Pre-Release of Lotus Notes 4.6 Client Provides Compelling New Integration with Internet Explorer, May 20, 1997 Press Release.
McCormick, Linda W., "Users of Credit Scoring Face Tough Rules on Notification", American Banker—May 21, 1982.
McShane, Peter K., "Got Financing?", Business Journal Serving Southern Tier, CNY, Sep. 15, 1997, vol. 11, Isue 19, p. 9.
Phillips 66 Introduces Mastercard with Rebate Feature, PR Newswire, Sep. 14, 1995.
"Reengineering Update-Outsourcing: An Option Full of Benefits and Responsibilities", American Banker, Oct. 24, 1994.
Sherman, Lee, "Wells Fargo Writes a New Online Script", Interactive Week, V5, n31, p. 19, Aug. 1998.
Staff, "On Line System Approves Loans while Customer Waits", Communications News, v. 31, N. 9, p. 27, Sep. 1994.
Stetenfeld, Beth, "Credit Scoring: Finding the Right Recipe", Credit Union Management, v17, n11, p. 24-26, Nov. 1994.
"VAR Agreement Expands Credit Bureau Access", Computers in Banking, v6, n10, p. 58.
"Wells Fargo Launches First Real-Time, Online Home Equity Credit Decision-Making Service", Business Wire, Jun. 3, 1998.
"What Do FICO Scores Mean to Me?", http://www.sancap.com, Nov. 4, 1999.
"What is a FICO Score?", http://www.aspenloan.com Nov. 4, 1999.
"What the Credit Bureau is Saying about you: If a Mistake Sneaks into your Record, you may not Know About it Until you get Turned down for Credit", Changing Times, v37, p. 56—Jul. 1983.
"World Wide Web enhances customers' choice", Cards International, n. 143, p. 9, Nov. 9, 1995.
"Bringing Services to Bank Customers," First Union Offers Online Credit Applications, More, Phillips Business Information Internet Week, vol. 1, Issue 7, May 22, 1995, Bates Nos. WH-HSBC 000039-41 (3 pages).
"BVCC Announces Definitive Agreement to Acquire PSB Lending Corp.," Business Editors/Banking Writers, Business Wire, New York, Jun. 10, 1998, Bates Nos. WH-HSBC 000042-49 (8 pages).
Akin, David, "New Software Suite Promises Credit History in Seconds," The Hamilton Spectator, Aug. 28, 1997, Bates Nos. WH-HSBC 000037-38 (2 pages).
Alexander, Walter, "What's the Score? (credit scoring)," Aug. 1, 1989, ABA Banking Journal, vol. 81, No. 8, Copyright 2007 Factiva, Inc., Bates Nos. WH-HSBC 000342-344 (3 pages).

Anonymous, "Managing Mortgages: Mortgage Technology at Work: Time is Money: Product Offers Fast Loan Approvals," National Mortgage News, New York, NY, Nov. 11, 1991, vol. 16, Issue 4, Bates No. WH-HSBC 000379 (1 page).
Avery, Robert B., et al., "Credit Risk, Credit Scoring, and the Performance of Home Mortgages," Jul. 1, 1996, Federal Reserve Bulletin, vol. 82, No. 7, Copyright 2007 Factiva, Inc., Bates Nos. WH-HSBC 000288-325 (38 pages).
Brockman, Joshua, "Lenders Discuss Ways to Tailor Credit Scoring for Mortgage Banks," American Banker, New York, NY, Jun. 12, 1998, vol. 163, Issue 111, Bates Nos. WH-HSBC 000376-378 (3 pages).
Burgess, Jr., Philip N., "Credit Grantors Reap Numerous Returns From Instantaneous Credit Evaluation Services," Credit World, May/Jun. 1995, Bates Nos. WH-HSBC 000239-241 (3 pages).
Case Study, "Lending—Network Cuts Auto Loan Approval Time to Minutes at NationsBank," ctauhert@mfi.com, Bates Nos. WH-HSBC 000380-381 (2 pages).
Clouse, Jeffery A., "On Training Automated Agents," Department of Computer Science, University of Massachusetts, CmpSci Technical Report 95-109, Feb. 1, 1995, Bates Nos. WH-HSBC 000382-424 (43 pages).
Collins, Brian, "United Guaranty Residential Insurance Co (Greensboro, NC) is Testing Mortgage Insurance for A-Minus and B Credit Loans; Complements Fannie Mae A-Minus Program," National Mortgage News, Jul. 6, 1998, Thomson Media Publisher, Bates Nos. WH-HSBC 000446-448 (3 pages).
Fannie Mae announces underwriting standardization, joint effort with Freddie Mac, Mortgage Bankers Association, PR Newswire, Sep. 8, 1988; American Banker @www.highbeam.com/doc/1G1-6951115.html (1 page).
Fannie partnership to put Underwriting System on Web, Oct. 28, 1998; American Banker @ www.highbeam.com/doc/1G1-53141162.html (3 pages).
Feldman, Ron, "Small Business Loans, Small Banks and a Big Change in Technology Called Credit Scoring," The Region, Sep. 1997, Federal Reserve Bank of Minneapolis, Bates Nos. WH-HSBC 000429-437 (9 pages).
Giesen, Lauri, "Building The On-Line Mortgage," Financial Service Online: 29+, Jul. 1997, Thomson Financial Inc. publisher, Bates Nos. WH-HSBC 000001-9 (9 pages).
Handley, John, "Real Estate—Knowing the Score: Report Tells It All," The Associated Press, Aug. 23, 1998, Greensboro News & Record, Copyright 2007 Factiva, Inc., Bates Nos. WH-HSBC 000335-341 (7 pages).
Johns, Constance C., "Credit Bureaus and Limited Credit Services Partner to Provide Customers Truly Quick Credit," Credit World, St. Louis, Nov./Dec. 1995, vol. 84, Iss. 2, Bates Nos. WH-HSBC 000236-238 (3 pages).
Kranhold, Kathryn, "'Identity Theft' Bill Leaves Credit Bureaus in the Cold," The Wall Street Journal (Eastern Edition), New York, NY, Jun. 4, 1997, Bates Nos. WH-HSBC 000345-349 (5 pages).
Kroll, Steve, "Online Application, Swift Approval Time Spices Up Best Buy/BNB Product," Card News, Potomac, Oct. 13, 1997, vol. 12, Issue 20, Bates Nos. WH-HSBC 000425-426 (2 pages).
Kulkosky, Edward, "Fannie Offers its systems for nonconforming loans. (Federal National Mortgage Association, automated underwriting)" by American Banker; Oct. 30, 1996 @www.highbeam.com/doc/1G1-18812526.html (1 page).
Lynch, Debora, et al., "Streamlining the System—Creating a Modern Credit Approval Environment," The Credit World, Sep./Oct. 1988, Bates Nos. WH-HSBC 000232-235 (4 pages).
Non-Final Office Action mailed Feb. 17, 2011, in U.S. Appl. No. 09/932,498.
Novack, Janet, "The Coming Fight Over FICO," Forbes, New York, NY, Dec. 18, 1995, vol. 156, Issue 14, Bates Nos. WH-HSBC 000443-445 (3 pages).
Patchett, Sharon, "Consumer Debt—Money Matters—If You are Reapplying for Credit Be Patient," Sep. 5, 1994, Syracuse Herald-Journal, Copyright 2007 Factiva, Inc., Bates Nos. WH-HSBC 000333-334 (2 pages).

Sirbu, Marvin A., "Electronic Payments—Credits and Debits on the Internet," IEEE Spectrum, Feb. 1997, Bates Nos. WH-HSBC 000242-248 (7 pages).

Steinbach, Gordon H., "Making Risk-Based Pricing Work," Sep. 1, 1998, Mortgage Banking, vol. 58, No. 12, Copyright 2007 Factiva, Inc., Bates Nos. WH-HSBC 000326-332 (7 pages).

Zions Bank Business Banking Online Resources, https://www.zionsbank.com/biz/business_finance.jsp?leftNav=bf_bfinance&topNav=bfin (1 of 2) Nov. 30, 2010, Bates Nos. ZBNEX00001963-2002 (40 pages).

Zions Bank Personal Banking Online Credit Card Resources, https://www.zionsbank.com/credit_cards.jsp?leftNav=pf_creditcard&topNav=pfinance Nov. 30, 2010, ZBNEX00002020-2113 (94 pages).

Zions Bank Personal Banking Online Resources, https://www.zionsbank.com/consumer_loan.jsp?leftNav=pf_loans%topNav=pfinance (1 of 2) Nov. 30, 2010, Bates Nos. ZBNEX00002003-2019 (17 pages).

Anon., "Lending Tree: Lending Tree Provides Borrowers Fast and Easy Online Access to Multiple Loan Offers," Business Wire, Jun. 23, 1998.

Harney, K.R., "Realty Brokers, Lenders Face Restrictions," Arizona Republic, Final Chaser edition, Sun Living section, p. S7, Feb. 10, 1991.

Higgins, K.T., "Mr. Plastic Joins the Marketing Team," Credit Card Management, vol. 6., No. 3, pp. 26-30, Jun. 1993.

* cited by examiner

ON-LINE BALANCE TRANSFERS

CROSS REFERENCE TO RELATED APPLICATIONS

This application is a continuation in part of co-pending U.S. patent application Ser. No. 09/185,000 entitled "METHOD AND APPARATUS FOR AN ACCOUNT LEVEL OFFER OF CREDIT AND REAL TIME BALANCE TRANSFER" filed Nov. 3, 1998 now U.S. Pat. No. 6,324,524, which is incorporated herein by reference for all purposes.

FIELD OF THE INVENTION

The present invention relates generally to on-line financial services. More specifically, a system and method for providing on-line balance transfers is disclosed.

BACKGROUND OF THE INVENTION

One important factor in determining the profitability of a credit account is the average revolving balance maintained by the account holder. As a result, it is desirable from the perspective of a provider of credit, such as a credit card issuer, to have credit account holders maintain a higher average revolving balance. One way a credit issuer may use to increase the average revolving balance maintained by a particular account holder is to get the account holder to transfer existing revolving credit balances from other accounts to the account held with the issuer. It would be very useful therefore to provide systems and methods that effectively encourage applicants for credit and existing credit account holders to transfer balances to a new or existing credit account from other credit or charge accounts.

Ideally, an account holder should be able to transfer a balance to a credit account with a minimum amount of effort by the account holder. Presently, credit card companies typically target new applicants in their efforts to promote balance transfers. New applicants typically are required to fill out a form and provide data relating to their various accounts as well as the amounts to transfer. Similar approaches are used to transfer balances to an existing credit account. It would be desirable if this process could be simplified for the account holder.

SUMMARY OF THE INVENTION

A system and method for on-line balance transfers are disclosed. An account holder initiates an on-line request for a balance transfer. The information necessary to process the balance transfer may be provided on-line by the account holder, or may be wholly or partly obtained from other sources in real time. The account holder identifies or confirms the accounts and amounts to be transferred. In the case of balance transfer requests that exceed an established balance transfer limit, modifications to the request may be suggested. The balance transfer request is processed, with information concerning the status of the balance transfer being made available to the account holder on line. Certain accounts may be identified as being ineligible for balance transfer.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

A method for online transfer of a balance from a first credit account associated with an account holder to a second credit account associated with the account holder is disclosed. In one embodiment, account data associated with the first credit account is obtained. The account data comprises at least the financial institution with which the first credit account is held. A determination is made as to whether the financial institution with which the first credit account is held is related to the financial institution with which the second credit account is held. The first credit account is identified as being not eligible for a balance transfer to the second credit account if it is determined that the first credit account is held with a financial institution that is related to the financial institution with which the second credit account is held.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
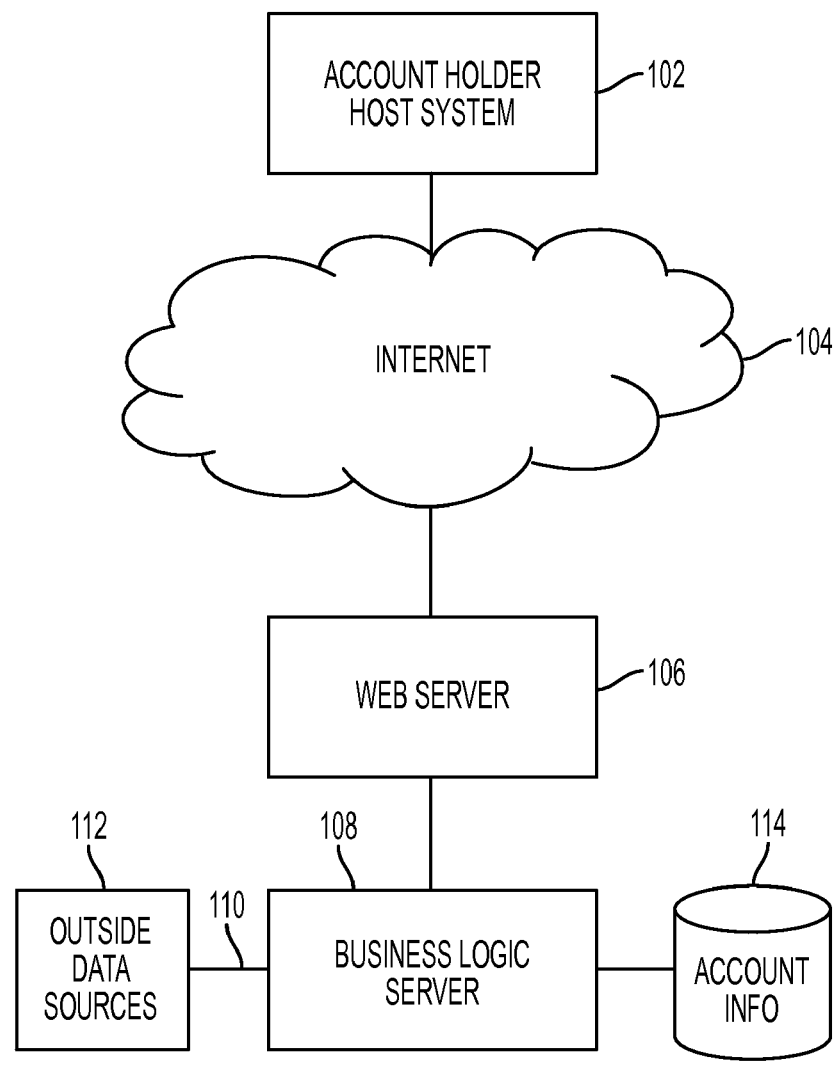
FIG. 1 is a block diagram illustrating one computer network scheme that may be used to implement the system and method described herein.

FIG. 1 is a block diagram illustrating one computer network scheme that may be used to implement the system and method described herein. An account holder host system 102 is connected to the Internet 104. The account holder host system may be a personal computer, a network computer, or any type of system that is able to transmit and receive information over the Internet. Also, in other embodiments, a private network such as a LAN or WAN, a virtual private network, a dedicated network, a telephone connection, or other connection may be used by the account holder to communicate. A web server 106 is also connected to the Internet 104 and communicates with the account holder host system 102 via the Internet 104 to request and receive information from the account holder and to notify the account holder of the status of the balance transfer process. Web server 106 in one embodiment accesses a business logic server 108 that implements the various balance transfer and status reporting processes described herein. It should be noted that in some embodiments, the web server and the business logic server may be implemented on a single computer system with one microprocessor. The business logic server is connected via a communication line 110 to one or more outside data sources 112, such as credit reporting bureaus, enabling the business logic server to retrieve data from the outside data sources. In some embodiments, an Internet or other network connection may be used for that purpose. The business logic server 108 also is connected to an account information database 114, in which data concerning the account holder's account, such as identifying information for the account holder, historical data concerning the account, and a previously established balance transfer limit and/or credit limit, may be stored. In one embodiment, the account information database 114 is implemented on the same computer as the business logic server 108. In one embodiment, the account information database is implemented on a separate computer.

Figure 2:
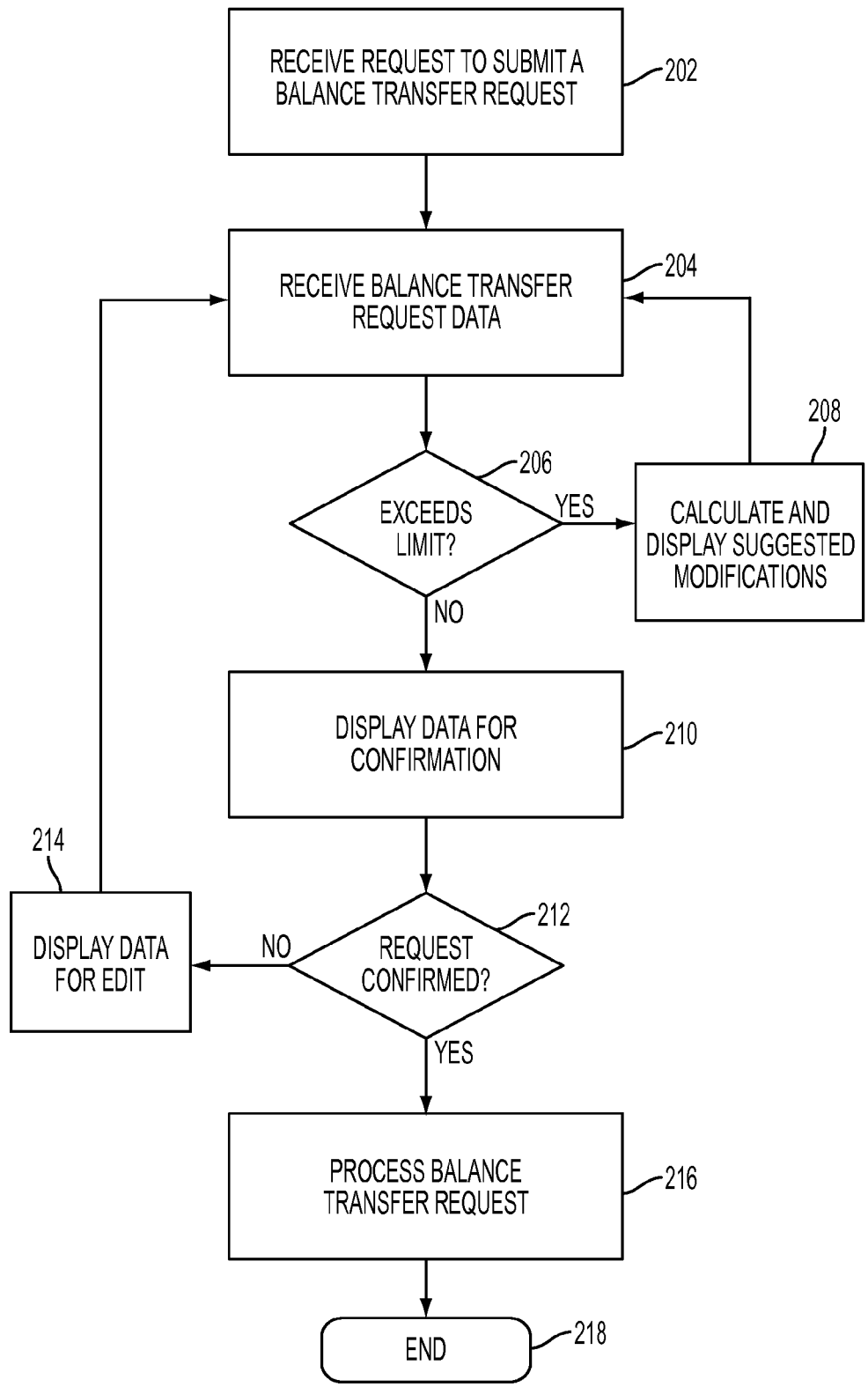
FIG. 2 is a flowchart illustrating a process used in one embodiment to receive and process a balance transfer request from a credit account holder.

FIG. 2 is a flowchart illustrating a process used in one embodiment to receive and process a balance transfer request from a credit account holder. In one embodiment, the process illustrated in FIG. 2 may be implemented using a computer network environment such as the computer network environment shown in FIG. 1. The process shown in FIG. 2 begins with step 202 in which a request to submit a balance transfer request is received. In one embodiment, the account holder may make a request to submit a balance transfer request by accessing a web page made available via the Internet by the financial institution with whom the account holder has the account and selecting a balance transfer request option on the financial institution's web page. In one embodiment, the web page is made available via the Internet by web server such as web server 106 of FIG. 1 and may be accessed by an account holder using a host computer system such as the account holder host system 102 of FIG. 1.

In step 204 of the process shown in FIG. 2, balance transfer request data is received. In one embodiment, the account holder may access the balance transfer request data input page directly, without making a request to submit a balance transfer request. In such an embodiment, step 202 of the process shown in FIG. 2 would be omitted. In one embodiment, the balance transfer request data is received in step 204 by displaying an on-line balance transfer request display to the account holder by means of a web page. In one embodiment, the web page includes fields in which the requesting account holder may enter such information as the card or account number for the account from which the balance is to be transferred, the institution with which the account is held, and the amount to be transferred from the account identified by the account holder to the account associated with the web page. In certain embodiments other or different information may be required to process a balance transfer request.

Once the balance transfer request data has been received in step 204, the process shown in FIG. 2 proceeds to step 206, in which it is determined whether the total amount of the balance transfer requested by the account holder exceeds the balance transfer limit associated with the account. In one embodiment, the balance transfer limit is established prior to any balance transfer request being received. In such an embodiment, the balance transfer limit may be stored in a database such as the account information database 114 of the system shown in FIG. 1. In one embodiment, the balance transfer limit may be determined in real time, such as by gathering data from the account holder, retrieving information from an account information database, and/or retrieving data from outside data sources, such as the outside data sources 112 of FIG. 1. In one embodiment, the balance transfer limit is determined by underwriting principles well known to those of ordinary skill in the art.

If it is determined in step 206 that the balance transfer request submitted by the account holder exceeds the balance transfer limit associated with the account holder's account, the process shown in FIG. 2 proceeds to step 208 in which suggested modifications to the balance transfer request submitted by the account holder are calculated and displayed to the account holder via a web page. For example, in one embodiment if a request were received to transfer a balance from a single account in an amount in excess of the balance transfer limit associated with the account holder's account associated with the web page, in step 208 the system may calculate and present to the account holder a proposed alternative balance transfer request in which a smaller balance transfer, such as one in the amount of the balance transfer limit for the account holder, would be made, leaving a smaller balance in the account from which the account holder wishes to transfer a balance. For example, if the balance transfer limit were five thousand dollars and the account holder made a request to transfer a balance of six thousand dollars from a single account, in step 208 it may be suggested to the account holder that the account holder transfer five thousand dollars from the account, leaving a balance of one thousand dollars. In one embodiment, where the account holder has submitted a request to transfer balances from more than one account, a trimming algorithm is employed in step 208 to calculate the suggested modifications to the submitted balance transfer request. In one embodiment, the trimming algorithm assumes that the account holder is most interested in transferring balances from accounts for which the account holder has requested the largest balance transfers. In one such embodiment, the accounts identified by the account holder are placed in order based on the amount of the balance transfer requested for each respective account and the account with the largest transfer request is satisfied first, followed by the second largest, and so on until no further balance transfer requests may be satisfied in the amount as requested by the account holder without exceeding the balance transfer limit. In such an embodiment, any remaining room under the balance transfer limit, if any, may be applied to the next account in order. For example, if an account holder requested that $2,500 be transferred to a first account, $2,000 be transferred to a second account, and $1,000 be transferred to a third account, in a situation in which the balance transfer limit was $5,000, the system may be configured to automatically propose to the account holder that an alternative request be submitted under which $2,500 would be transferred to the first account, $2,000 transferred to the second account and the remaining $500 available under the balance transfer limit be transferred to the third account. In one embodiment, the account holder's outstanding balance with each of the respective accounts identified in the balance transfer request are known, such as because that information was provided by the account holder or retrieved from a credit bureau, and the system may instead prioritize the balance transfers requested by the account holder to give priority to the transfer of balances that will result in the total outstanding balance for an account being paid off. Such an algorithm may be based, for example, on the assumption that the account holder would prefer to close out one or more of the accounts identified in the balance transfer request for purposes of consolidating and managing debt, or on the assumption or belief that the account holder will be more likely to close accounts for which the total outstanding balance has been transferred, thereby increasing the likelihood that the account holder would use the account associated with the website more in the future.

Once suggested modifications have been calculated and displayed to the account holder in step 208, the process returns to step 204 in which modified balance transfer request data is received. In one embodiment, the suggested changes calculated in step 208 may be displayed in step 208 in a web page that includes a button that the account holder may select to submit the modified balance transfer request calculated by the system as a new balance transfer request. In one embodiment, the display presented in step 208 may permit the account holder to edit balance transfer amounts suggested in the page displayed in step 208 and submit in step 204 a modified requested balance transfer reflecting the edits made by the account holder.

If it is determined in step 206 that the balance transfer request received in step 204 does not exceed the balance transfer limit associated with the account holder's account, the process proceeds to step 210 in which the balance transfer data is displayed to the account holder for confirmation. In one embodiment, this step may be included to enable the account holder to identify typographical or other errors prior to the initiation of processing by the financial institution.

In step 212 of the process shown in FIG. 2, it is determined whether the account holder confirmed the balance transfer request data. If it is determined in step 212 that the account holder did not confirm the balance transfer request data as correct, the process proceeds to step 214 in which the balance transfer data is displayed to the account holder for editing. Once the balance transfer data has been displayed to the account holder for editing in step 214, the process proceeds to step 204 in which edited balance transfer data is received from the account holder. The process then continues as described above.

If it is determined in step 212 that the account holder confirmed the balance transfer data as correct, the process proceeds to step 216 in which the balance transfer request is processed as described more fully below. In one embodiment, the balance transfer request is processed by obtaining additional pay off information, if necessary, from the financial institutions at which the accounts from which balances are being transferred are held, followed by making payments to those financial institutions and posting each payment as a new charge to the account holder's account, as described more fully below. The process shown in FIG. 2 then ends in step 218.

Figure 3:
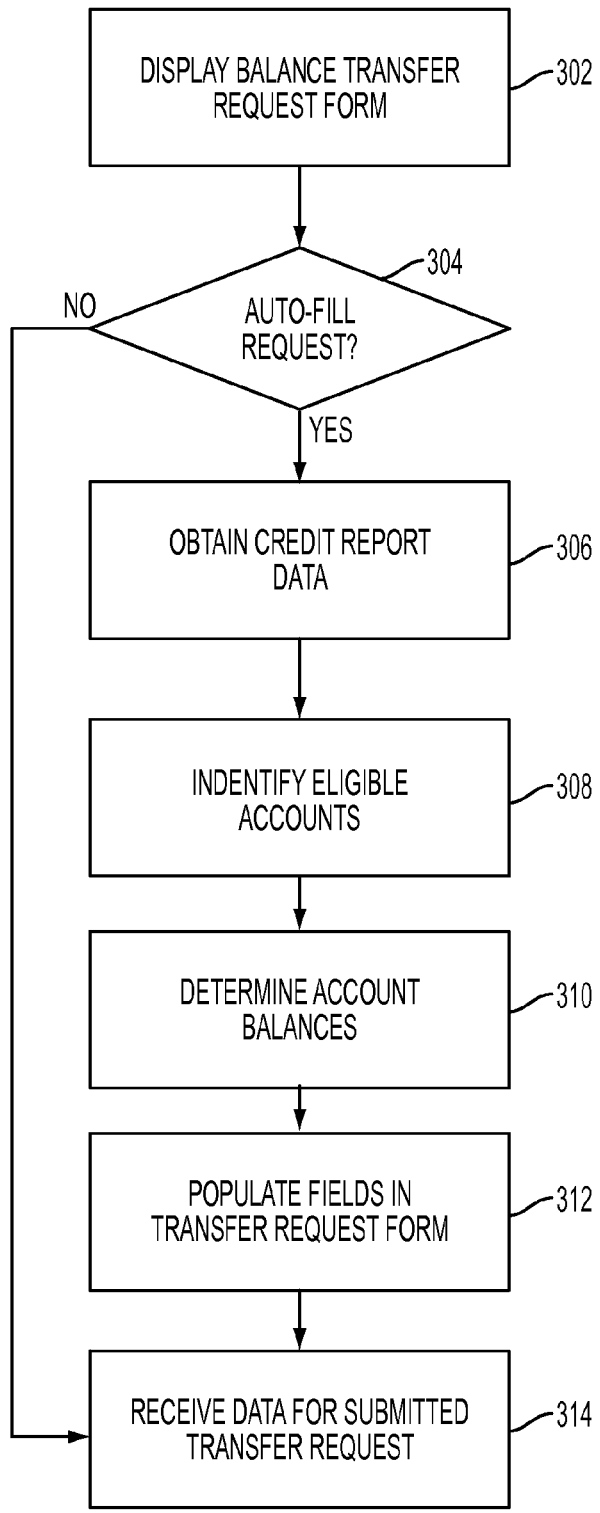
FIG. 3 is a flowchart illustrating a process used in one embodiment to receive balance transfer request data as in step 204 of FIG. 2.

FIG. 3 is a flowchart illustrating a process used in one embodiment to receive balance transfer request data as in step 204 of FIG. 2. The process begins with step 302 in which a balance transfer request form is displayed. In one embodiment, the balance transfer request form includes empty fields in which the account holder may enter information such as a credit card or other account number, the financial institution with which the account is held, and the amount to be transferred from the indicated account to the account associated with the web page. In one embodiment, the balance transfer request form includes a button which the account holder may select to request that some or all of the balance transfer request data be filled in automatically by obtaining data from sources other then the account holder. In one embodiment, information may be obtained from outside data sources such as a credit reporting bureau. In step 304 of the process shown in FIG. 3, it is determined whether the account holder has requested that credit account data be obtained from a source other than the account holder. If it is determined in step 304 that the account holder has requested that data be obtained from a source other than by being input by the account holder, referred to in FIG. 3 and elsewhere herein as an "auto-fill" request, the process shown in FIG. 3 proceeds to step 306 in which credit report data is obtained from a credit reporting agency. In one embodiment, the credit report is obtained using identifying information for the account holder retrieved from an account information database associated with the account holder's account.

In step 308 of the process shown in FIG. 3, the credit report data is processed to identify accounts from which the cardholder may be permitted to transfer balances to the credit account associated with the website. In one embodiment, the cardholder may not transfer any balance from an account held with the financial institution providing the web page, or a related institution, to another account held with that same financial institution, to avoid allowing account holders to shuffle balances between accounts with the same financial institution without paying any finance change or interest to the financial institution. In one embodiment, eligible accounts are identified by checking the financial institution associated with each account against a list of ineligible financial institutions. In one embodiment, the list of ineligible financial institutions includes the financial institution associated with the web page and any related financial institutions.

In step 310 of the process shown in FIG. 3, the account balances of the eligible accounts are determined. In one embodiment, the account balances are determined by processing the data received from the credit reporting agency and associating an account balance with each eligible account.

In step 312 of the process shown in FIG. 3, the previously empty fields of the balance transfer request form are populated with the data obtained and identified in steps 306, 308, and 310. In one embodiment, the form in which the data presented in 312 is displayed includes blank fields to permit the account holder to indicate the amount to be transferred from each account, which enables the account holder to specify an amount less than or equal to the outstanding balance as the amount of balance to be transferred. In one embodiment, only part of the account or card number is displayed, with certain digits of the account number hidden from view for security reasons. In one embodiment, a sufficient number of digits is displayed to enable the account holder to identify the account.

Once the balance transfer request form data fields have been populated in step 312, or if it is determined in step 304 that the account holder has not requested that data for the balance transfer request form be obtained from a source other than the account holder, the process shown in FIG. 3 proceeds to step 314 in which data for a submitted balance transfer request is received. In one embodiment, the balance transfer request form presented in step 302 and, where requested, partially completed for the account holder in step 312 includes a "submit" button, which the account holder may select to indicate that the data displayed and/or entered in the form should be submitted for processing as the account holder's balance transfer request.

Figure 4:
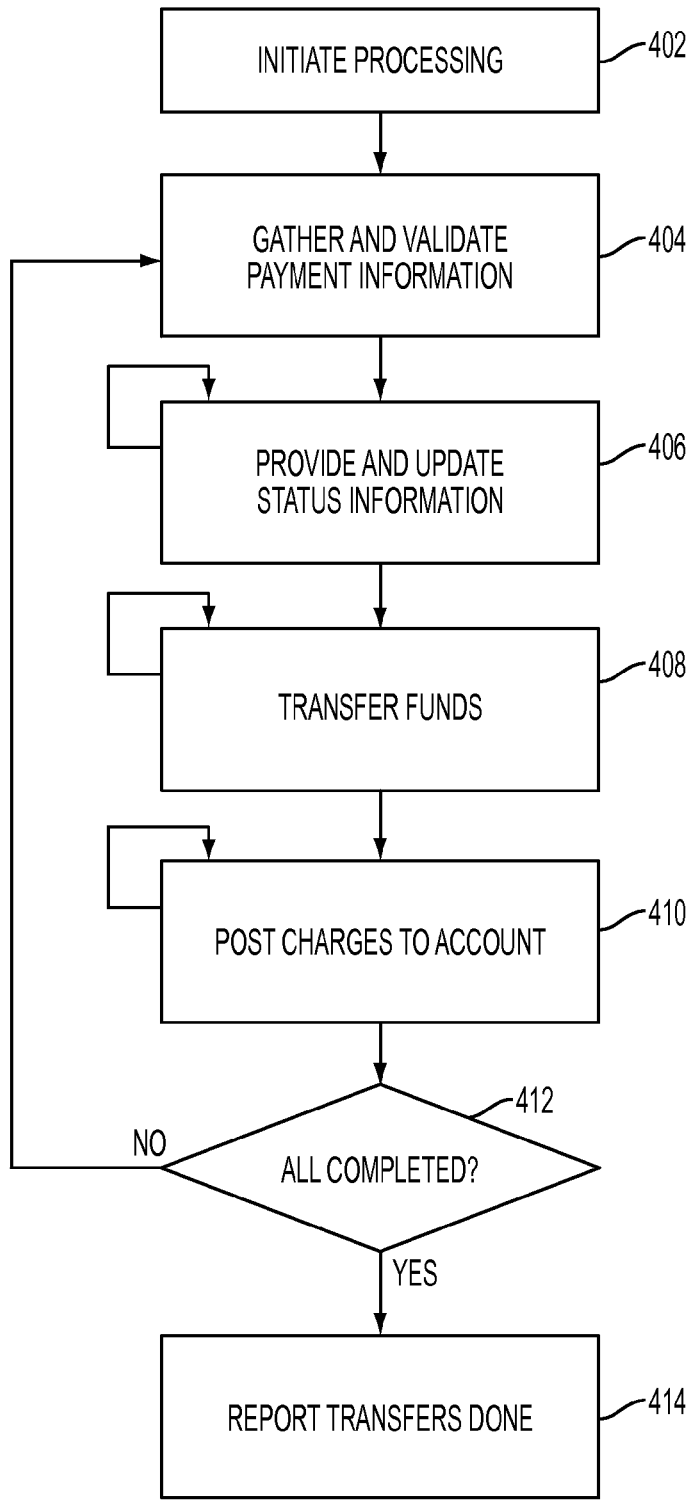
FIG. 4 is a flow chart illustrating a process used in one embodiment to process a balance transfer request, as in step 216 of FIG. 2.

FIG. 4 is a flow chart illustrating a process used in one embodiment to process a balance transfer request, as in step 216 of FIG. 2. The process begins with step 402 in which processing of the balance transfer request is initiated. In one embodiment, the processing of the balance transfer request is initiated once the balance transfer request has been received and confirmed.

In step 404 of the process shown in FIG. 4, payment information necessary to complete the balance transfer request is gathered and validated. The information to be gathered may include such information as the address to which to send a payment check to the financial institution from which a balance is to be transferred. Additional or different information to be gathered may include information necessary to make an electronic transfer of funds to such a financial institution. In one embodiment, information may be gathered by contacting financial institutions, by obtaining information from third party sources for proprietary databases, by requesting additional information from the account holder, and/or from other information sources. In one embodiment, information may be validated, for example, by confirming that the requisite number of digits are included in the information that has been provided and/or obtained, such as confirming that a credit card account number conforms to the sixteen digit convention for such account numbers.

In step 406 of the process shown in FIG. 4, status information is provided to the account holder and updated periodically. In one embodiment, status information may be provided to the account holder in the form of an electronic mail message or alert informing the account holder of a change in the status of a balance transfer request. For example, if a payment has been sent to a particular financial institution on behalf of the account holder, an electronic mail message may be sent to the account holder informing the account holder that the payment has been sent. In one embodiment, status information may be posted to a web page accessible by the account holder, enabling the account holder to check the status of the balance transfer request at the account holder's convenience. In one embodiment, the status conditions that may be reported on such a web page may include a "pending" status indicating that the balance transfer request is pending and is being processed, a "completed" status indicating that the balance transfer request has been completed and that payment has been sent, a "rejected" status indicating that the balance transfer request has been rejected and will not be completed, or a "more information needed" status indicating that the account holder should contact a customer service representative to provide additional information. In one embodiment, general status conditions such as those listed above may correspond to one or more specific internal status conditions. The more specific internal status conditions may be used internally to provide more specific information to financial institution personnel, such as customer service representatives. In one embodiment, the status of each balance transfer request is updated on a periodic basis, for example on a daily basis. In one alternative embodiment, the status information is updated on a real time basis as each balance transfer request is processed. In one such embodiment, for example, the status reflected on the web page may be changed from "pending" to "completed" once the balance transfer has been completed, as opposed to waiting for the next day's update of the balance transfer status information. As indicated in FIG. 4, step 406 corresponds to a dynamic process by which information is updated either periodically or as events occur, and as a result step 406 may be repeated as necessary to reflect changes in the status of balance transfer requests in the manner and with the frequency required in a particular application.

In step 408 of FIG. 4, funds are transferred to the financial institutions from which balances are being transferred. As shown in FIG. 4, step 408 may be repeated as necessary, until payment has been made to all of the financial institutions from which the account holder has requested that a balance be transferred. In one embodiment, funds may be transferred by sending a check to the financial institution from which a balance is being transferred. In one embodiment, other forms of funds transfers may be employed, such as an electronic funds transfer.

In step 410 of FIG. 4, a charge is posted to the account holder's account for each payment made to a financial institution from which a balance has been transferred.

In step 412 of FIG. 4, it is determined whether all balance transfers included in the balance transfer request received from the account holder have been completed. If all balance transfers included in the request have not been completed, the process returns to step 404 and steps 404, 406, 408, and 410, are repeated or performed as necessary, until all four steps have been completed with respect to each financial institution from which the account holder has requested that a balance be transferred. If it is determined in step 412 that all of the balance transfers included in the balance transfer request have been completed, the process proceeds to step 414 in which the system is updated to reflect the fact that the balance transfers have been completed. In one embodiment, step 414 includes sending an e-mail message to the account holder advising the account holder that all balance transfers included in the request have been completed. In one embodiment, status information for the balance transfer requests remains available to the account holder on the status web page described above for a predetermined period following the completion of the balance transfer request.

Figure 5:
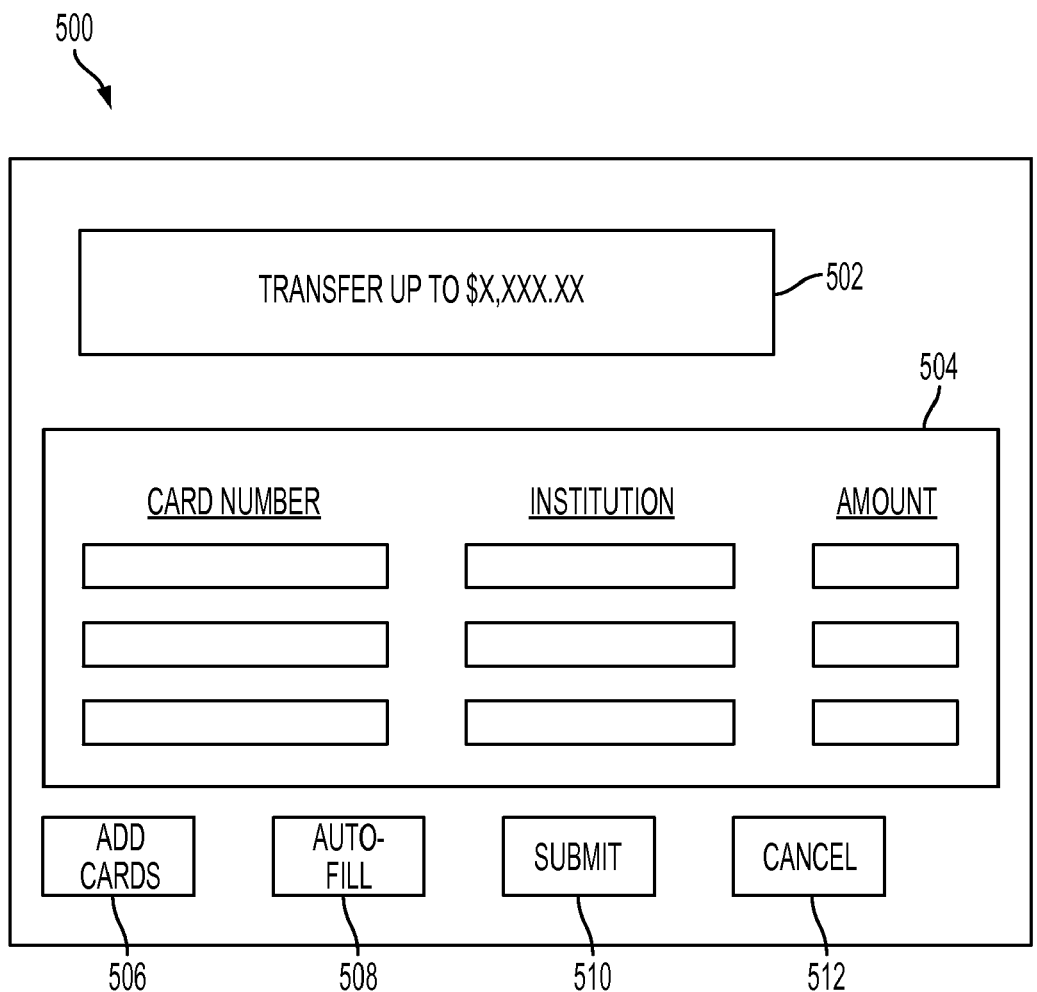
FIG. 5 shows an exemplary "balance transfer request form" display 500, such as may be displayed in step 302 of FIG. 3.

FIG. 5 shows an exemplary "balance transfer request form" display 500, such as may be displayed in step 302 of FIG. 3. The display 500 includes a balance transfer limit display area 502 in which the maximum amount the account holder may transfer to the account from other accounts is displayed. The display 500 further comprises an account information entry area 504. The account information entry area 504 includes a plurality of data entry boxes positioned under the heading "card number", which may be used by the account holder to enter credit account numbers. The credit account information entry area 504 includes a second plurality of data entry boxes positioned under the heading "institution", in which the account holder may enter the name of the financial institution with which each respective account listed in the "card number" column is held. Finally, the account information entry area 504 includes a third plurality of data entry boxes positioned under the heading "amount", in which the account holder may specify the amount of the balance transfer requested with respect to each account identified by card number and institution name in the preceding two columns.

The display 500 further includes an "add cards" button 506. In one embodiment the "add cards" button 506 enables the account holder to enter card number, institution, amount information for additional accounts if all the fields originally available in account information entry area 504 have been used, such as to add a fourth account to a balance transfer request if the three account information rows shown in account information entry area 504 of FIG. 5 have been used for three other accounts. The display 500 also includes a button 508 labeled "auto-fill". In one embodiment, selection of the "auto-fill" button 508 results in information about the card holder's existing credit accounts being obtained from a source other than the account holder, if information is available from such other sources. For example, as described above in connection with steps 304 and 306 of FIG. 3, credit account information may be obtained in some cases from credit reporting agencies.

The display 500 further includes a "submit" button 510. In one embodiment, when the "submit" button 510 is selected by the account holder, the account data that appears in the fields of account information entry area 504 is submitted via the Internet to the financial institution associated with the web page. The display 500 also includes a "cancel" button 512. In one embodiment, selection of the "cancel" button 512 results in the fields of the account information entry are being cleared and no balance transfer request information being sent to the financial institution associated with the web page.

Figure 6:
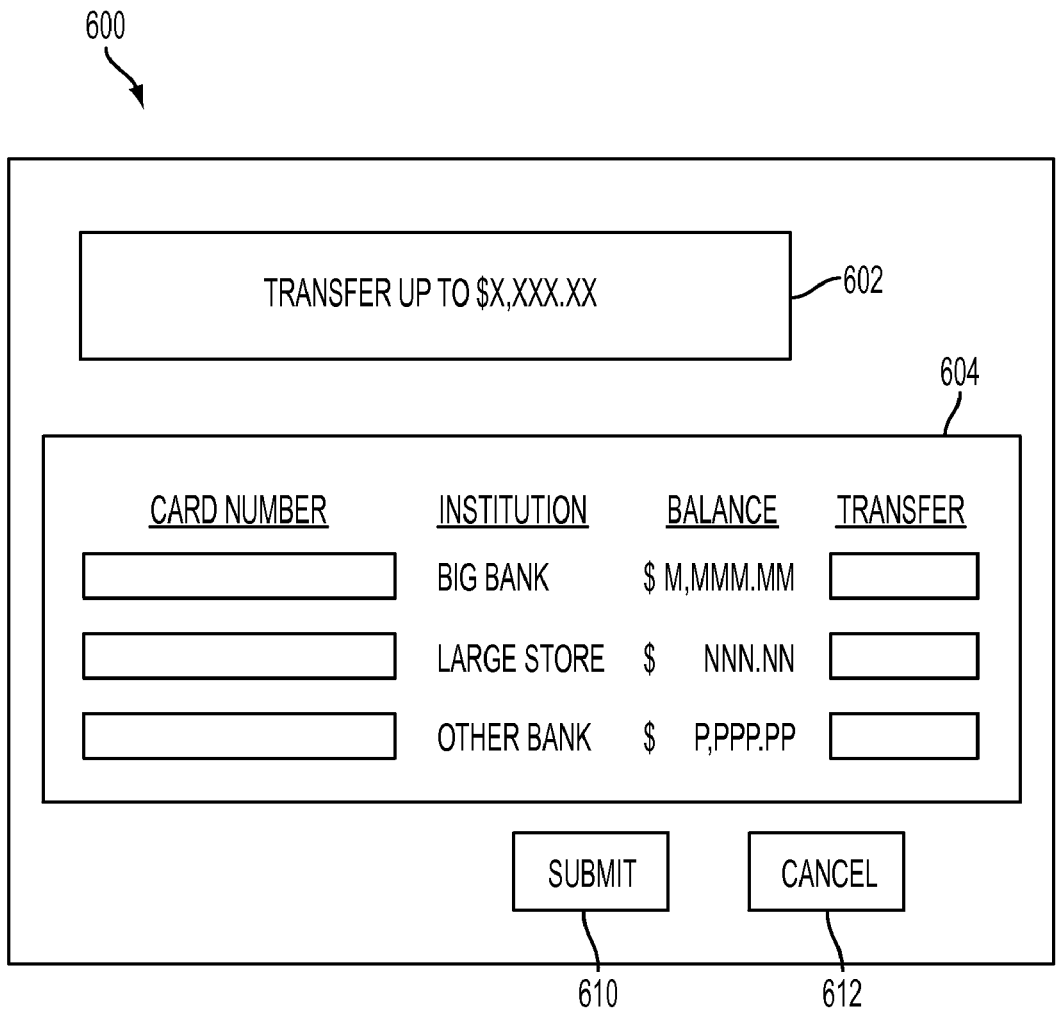
FIG. 6 shows an exemplary "automatically filled balance transfer request form" display 600, such as may be used in one embodiment to display automatically obtained information in the balance transfer request form, as in step 312 of FIG. 3.

FIG. 6 shows an exemplary "automatically filled balance transfer request form" display 600, such as may be used in one embodiment to display automatically obtained information in the balance transfer request form, as in step 312 of FIG. 3.

The display 600 includes a balance transfer limit display area 602, which is the same as the balance transfer limit display area 502 of FIG. 5. The display 600 further includes an account information entry and display area 604. The account information entry and display area 604 is similar to the account information are 504 of FIG. 5, except that certain information has been provided automatically. As shown in FIG. 6, in one embodiment the account information entry and display area 604 comprises four columns. The first column is labeled "card number" and has a plurality of data entry boxes in which the account holder may enter card number data. In one embodiment, the card or account number data is obtained from a source other than the account holder, such as from a credit report, and is entered wholly or in part in the card number column of the account information entry and display area 604. In one embodiment, for security purposes, any account numbers displayed automatically are only partially displayed, with sufficient digits of the account number being displayed to enable the account holder to identify the account.

The account information entry and display area 604 includes a second column labeled "institution" in which the names of three financial institutions are displayed. As described above, the names of the financial institution with which the account holder has accounts from which the account holder may wish to transfer balances may be determined in one embodiment by obtaining data from third party data sources, such as from credit reporting agencies. The account information entry and display area 604 includes a third column, labeled "balance" in which the account holder's outstanding credit balance with each respective financial institution listed in the second column of the area 604 is displayed. In one embodiment, the balance listed in the account information entry and display area 604 is an estimated balance based on the data as reported by a third party data source, such as a credit reporting agency. In one embodiment, the outstanding balance is labeled as an "estimated balance". Finally, the account information entry and display area 604 includes a fourth column labeled "transfer", which includes a plurality of data entry boxes to enable the account holder to specify the amount to be transferred to each respective financial institution. In one embodiment, the data entry boxes in the fourth column of the account information entry and display area 604 are pre-populated automatically with the balance or estimated balance listed in the third column of the account information and display area 604, and the account holder is provided with an opportunity to reduce or erase the transfer amount inserted initially by the system.

The display 600 also includes a "submit" button 610, which corresponds to and operates in the same manner as the "submit" button 510 of FIG. 5. Finally, the display 600 contains a "cancel" 612, which corresponds to and operates in the same manner as the cancel button 512 of FIG. 5.

Figure 7:
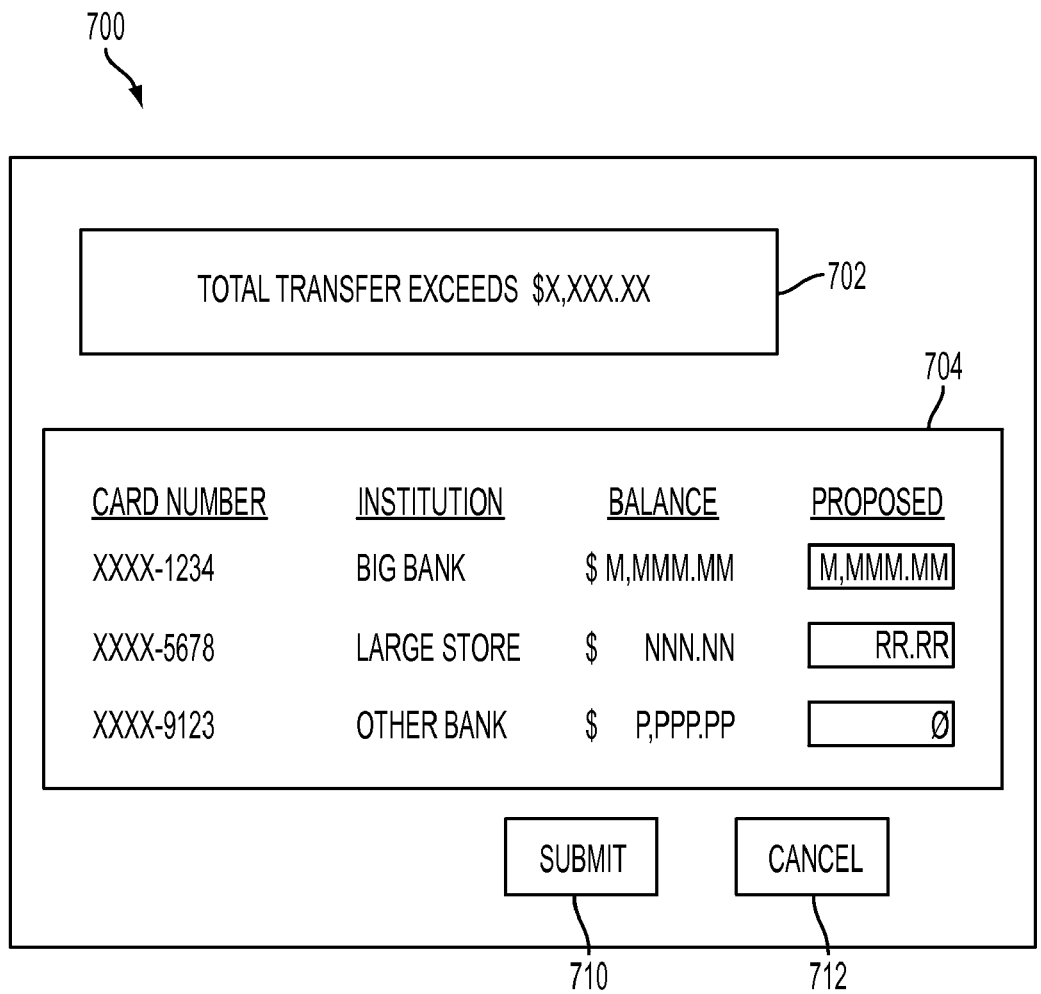
FIG. 7 shows an exemplary "proposed modification" display 700 used in one embodiment to propose and receive modifications to a balance transfer request that exceeds the balance transfer limit for the account, as in step 208 of FIG. 2.

FIG. 7 shows an exemplary "proposed modification" display 700 used in one embodiment to propose and receive modifications to a balance transfer request that exceeds the balance transfer limit for the account, as in step 208 of FIG. 2. The display 700 includes a message area 702 in which a message may be displayed informing the account holder that the balance transfer requests submitted by the account holder exceeded the balance transfer limit established for the account holder's account.

The display 700 also includes an account information entry and display area 704, in which information about the credit accounts identified by the account holder as accounts from which balances should be transferred may be displayed. As shown in FIG. 7, in one embodiment the account information entry and display area 704 includes a first column in which card or account numbers are listed. In one embodiment, as shown in FIG. 7 only a part of the account number, such as the last four digits is displayed, for security proposes. The account information entry and display area 704 also includes a second column labeled "institution" in which the name of each respective financial institution corresponding to the accounts listed in the first column may be displayed. The account information entry and display area 704 includes a third column labeled "balance" in which the balance information for each credit account identified in the first column may be displayed. The account information entry and display area 704 further includes a fourth column, labeled "proposed". As shown in FIG. 7, the fourth column includes a data entry box for each credit account included in the original balance transfer requests. In one embodiment, a proposed balance transfer amount is calculated for each such credit account and displayed in the fourth column of the account information entry and display area 704, as discussed in connection with step 208 of FIG. 2. In the particular example displayed in FIG. 7, the data entry boxes in the fourth column have been pre-populated with proposed amounts equal to the balance of the first credit account, an amount less than the balance due for the second credit account and no transfer or zero for the third credit account, in order to bring the total balance transfer request amount within the limit displayed in the message area 702. Illustrative examples of algorithms that may be used in certain embodiments to determine the amounts to be inserted automatically in the data entry boxes in the fourth account information entry and display area 704 are described above, in connection with step 208 of FIG. 2.

The display 700 further includes a "submit" button 710, which corresponds to and operates in the same manner as the "submit" button 510 of FIG. 5. The display 700 also includes a "cancel" button 712, which operates in the same manner as the "cancel" button 512 of FIG. 5.

Figure 8:
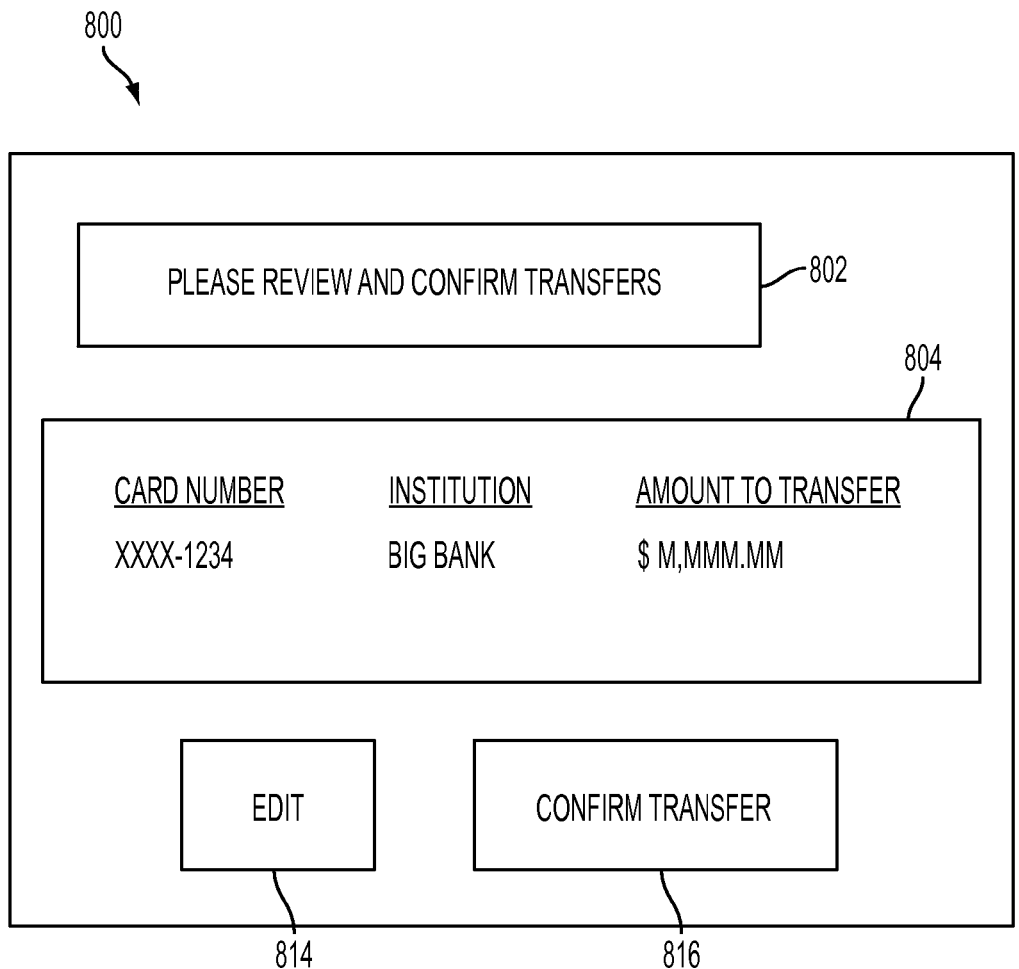
FIG. 8 shows an exemplary "balance request confirmation" display 800, such as may be used in one embodiment to request and obtain confirmation of the balance transfer request data from the account holder, as in step 212 of FIG. 2.

FIG. 8 shows an exemplary "balance request confirmation" display 800, such as may be used in one embodiment to request and obtain confirmation of the balance transfer request data from the account holder, as in step 212 of FIG. 2. The display 800 also includes a message display area 802, in which a message providing instructions to the account holder may be displayed. In the specific example shown in FIG. 8, the message instructs the account holder to review and confirm the accuracy of the balance transfer request data.

The display 800 further includes a balance transfer request data display area 804, in which the balance transfer request data received from the account holder is displayed. As shown in FIG. 8, in one embodiment the balance transfer request data display area 804 comprises three columns, a first column in which card or account number data is displayed, a second column in which the financial institution associated with each account listed in the first column is displayed, and a transfer amount column in which the amount of balance to be transferred from each account listed is displayed. The display 800 further includes an "edit" button 814. In one embodiment, the "edit" button 814 may be selected by the account holder to gain access to a page that will permit the account holder to edit the balance transfer request data displayed in the display area 804. In one embodiment, the edit display presented to the account holder upon selection of the "edit" button 814 is the same as or similar to the balance transfer request form display 500 shown in FIG. 5, with the data entry fields populated, as appropriate, with the balance transfer request data received from the account holder. The account holder may then edit the data in the various data entry fields or enter additional or different information, and submit the information as a new request to be processed as described above. The display 800 further includes a "confirm transfer" button 816, which the account holder may select to confirm that the balance transfer request data displayed in display area 804 is correct. In one embodiment, selection of the "confirm transfer" button 816 by the account holder initiates processing of the balance transfer request, as described above in connection with step 216 of FIG. 2 and the process shown in FIG. 4.

Figure 9:
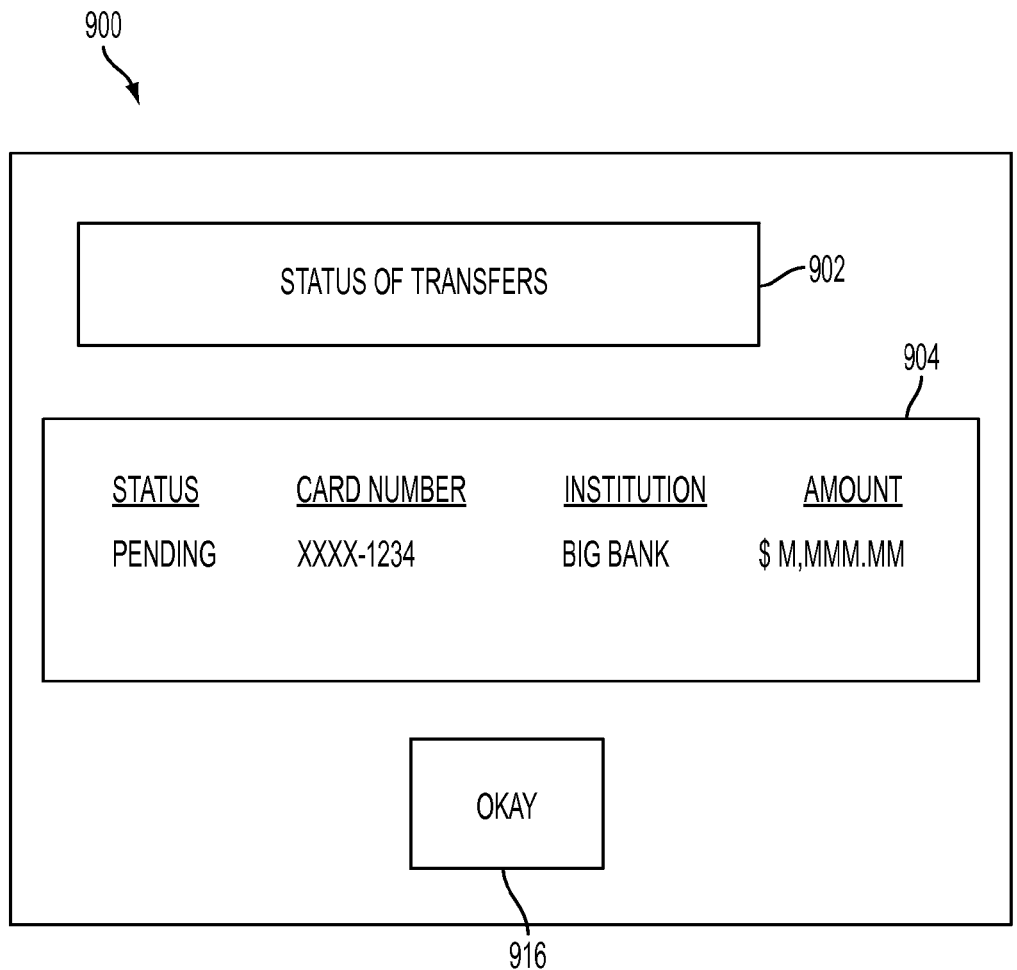
FIG. 9 shows an exemplary "balance transfer status" display 900, such as may be used in one embodiment to provide and update balance transfer status information, as described above in connection with step 406 of FIG. 4.

FIG. 9 shows an exemplary "balance transfer status" display 900, such as may be used in one embodiment to provide and update balance transfer status information, as described above in connection with step 406 of FIG. 4. The display 900 includes heading display area 902, in which an appropriate heading may be displayed. As shown in FIG. 9 in one embodiment, the heading "status of transfers" is displayed in the heading display area 902. The display 900 further includes a balance transfer request status display area 904 in which information concerning the status of balance transfer requests submitted by the account holder may be displayed. In one embodiment, as shown in FIG. 9, the balance transfer status area 904 comprises a first column, labeled "status", in which the status of any balance transfer requests submitted by the account holder may be displayed. An exemplary scheme of status conditions and their meaning is described above in connection with step 406 of FIG. 4. As shown in FIG. 9, in one embodiment, the balance transfer status information display area 904 includes additional columns for displaying information identifying the balance transfer requests submitted by the account holder, including columns for the card or account number, the financial institution, and the amount to be transferred. In other embodiments, as will be apparent to those of ordinary skill in the art, other or different information may be included in the balance transfer status display area 904. Finally, the display 900 includes an "okay" button 916, which may be selected by the account holder to indicate that the account holder is done viewing the balance transfer status information. In one embodiment, selection of the "okay" button 916 results in the balance transfer status information display 900 being closed.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer implemented method for online transfer of a balance from a first credit account associated with an account holder to a second credit account associated with the account holder comprising:
   receiving at a computer a balance transfer request for transferring a balance from the first credit account to the second credit account;
   obtaining account data associated with the first credit account, said account data comprising at least an identifier for a first financial institution with which the first credit account is held;
   determining with a business logic server, using the account data associated with the first credit account, whether the first financial institution with which the first credit account is held is related to a second financial institution with which the second credit account is held; and
   processing the balance transfer request if it meets all of at least one eligibility requirement for transferring the balance, and otherwise not processing the balance transfer request; the at least one eligibility requirement comprising a requirement that the first credit account and the second credit card account not be held by related financial institutions.

2. A computer implemented method for online transfer of a balance from a first credit account to a second credit account as recited in claim 1, wherein the account data associated with the first credit account is obtained in real time.

3. A computer implemented method for online transfer of a balance from a first credit account to a second credit account as recited in claim 1, wherein the account data associated with the first credit account is obtained from a source other than the account holder.

4. A computer implemented method for online transfer of a balance from a first credit account to a second credit account as recited in claim 3, wherein the source other than the account holder is a credit reporting bureau.

5. A computer implemented method for online transfer of a balance from a first credit account to a second credit account as recited in claim 1, wherein the first and second financial institutions are identical.

6. A computer implemented method for online transfer of a balance from a first credit account to a second credit account as recited in claim 1, wherein the first financial institution is considered related to the second financial institution if the first financial institution is affiliated with the second financial institution.

7. A computer implemented method for online transfer of a balance from a first credit account to a second credit account as recited in claim 1, wherein determining whether the first financial institution is related to the second financial institution comprises comparing the first financial institution with a list of ineligible financial institutions.

8. A computer implemented method for online transfer of a balance from a first credit account to a second credit account as recited in claim 7, wherein the list of ineligible financial institutions comprises the second financial institution and any financial institutions associated with the second financial institution with which the second credit account is held.

9. A computer implemented method for online transfer of a balance from a first credit account to a second credit account as recited in claim 1, further comprising:
receiving from the account holder an indication that the account holder is interested in transferring a balance to the second credit account; and
wherein obtaining account data is performed in response to receiving said indication.

10. A computer implemented method for online transfer of a balance from a first credit account to a second credit account as recited in claim 1, further comprising displaying at least a portion of said account data associated with the first credit account to the account holder.

11. A computer implemented method for online transfer of a balance from a first credit account to a second credit account as recited in claim 1, further comprising displaying at least a portion of said account data associated with the first credit account to the account holder in the event it is determined that the first financial institution is not the same as or affiliated with the second financial institution.

12. A computer implemented method for online transfer of a balance from a first credit account to a second credit account as recited in claim 1, further comprising:
providing to the account holder a balance transfer request display, the balance transfer request display comprising a data entry field; and
populating the data entry field with at least one element of said account data associated with the first credit account.

13. A computer implemented method for online transfer of a balance from a first credit account to a second credit account as recited in claim 1, further comprising:
providing to the account holder a balance transfer request display, the balance transfer request display comprising a data entry field; and
in the event it is determined that the first financial institution is not the same as or affiliated with the second financial institution, populating the data entry field with at least one element of said account data associated with the first credit account.

14. A system for online transfer of a balance comprising:
a computer system configured to:
receive an online balance transfer request for transferring a balance from a first credit account associated with an account holder to a second credit account associated with the account holder;
obtain account data associated with the first credit account, said account data comprising at least-information identifying a first financial institution with which the first credit account is held;
determine whether the online balance transfer request meets at least one eligibility requirement, the at least one eligibility requirement comprising a requirement that the first financial institution with which the first credit account is held is not related to a second financial institution with which the second credit account is held; and
process the online balance transfer request if all eligibility requirements are met and, otherwise, not processing the online balance transfer request; and
a network connection associated with the computer system and configured to enable the computer system to receive data transmissions from and send data transmissions to the account holder.

15. A system for online transfer of a balance from a first credit account to a second credit account as recited in claim 14, wherein said computer system comprises two or more computers.

16. Non-transitory computer readable media storing computer instructions, which, when read by a computer causes the computer to perform a method comprising:
receiving at a computer a balance transfer request for transferring a balance from the first credit account to the second credit account;
obtaining account data associated with the first credit account, said account data comprising at least an identifier for a first financial institution with which the first credit account is held;
determining with a business logic server, using the account data associated with the first credit account, whether the first financial institution with which the first credit account is held is related to a second financial institution with which the second credit account is held; and
processing the balance transfer request if it meets all of at least one eligibility requirement for transferring the balance, and otherwise not processing the balance transfer request; the at least one eligibility requirement comprising a requirement that the first credit account and the second credit card account not be held by related financial institutions.

17. The non-transitory computer readable media of claim 16, wherein the account data associated with the first credit account is obtained in real time.

18. The non-transitory computer readable media of claim 16, wherein the account data associated with the first credit account is obtained from a source other than the account holder.

19. The non-transitory computer readable media of claim 18, wherein the source other than the account holder is a credit reporting bureau.

20. The non-transitory computer readable media of claim 16, wherein the first and second financial institutions are identical.

21. The non-transitory computer readable media of claim 16, wherein the first financial institution is considered related to the second financial institution if the first financial institution is affiliated with the second financial institution.

22. The non-transitory computer readable media of claim 16, wherein determining whether the first financial institution is related to the second financial institution comprises comparing the first financial institution with a list of ineligible financial institutions.

23. The non-transitory computer readable media of claim 22, wherein the list of ineligible financial institutions comprises the second financial institution and any financial institutions associated with the second financial institution with which the second credit account is held.

24. The non-transitory computer readable media of claim 16, wherein the method further comprises:
receiving from the account holder an indication that the account holder is interested in transferring a balance to the second credit account; and
wherein obtaining account data is performed in response to receiving said indication.

25. The non-transitory computer readable media of claim 16, wherein the method further comprises displaying at least a portion of said account data associated with the first credit account to the account holder.

26. The non-transitory computer readable media of claim 16, wherein the method further comprises displaying at least a portion of said account data associated with the first credit account to the account holder in the event it is determined that the first financial institution is not the same as or affiliated with the second financial institution.

27. The non-transitory computer readable media of claim 16, wherein the method further comprises:
provides to the account holder a balance transfer request display, the balance transfer request display comprising a data entry field; and
populating the data entry field with at least one element of said account data associated with the first credit account.

28. The non-transitory computer readable media of claim 16, wherein the method further comprises:
providing to the account holder a balance transfer request display, the balance transfer request display comprising a data entry field; and
in the event it is determined that the first financial institution is not the same as or affiliated with the second financial institution, populating the data entry field with at least one element of said account data associated with the first credit account.

\* \* \* \* \*